US007793797B2

(12) United States Patent  (10) Patent No.: US 7,793,797 B2
Jarisch et al.  (45) Date of Patent: Sep. 14, 2010

(54) CAPSULE-DISPENSING CABINET FOR SUPPLYING MACHINES FOR THE PREPARATION OF DRINKS OR OTHER FOOD PREPARATIONS

(75) Inventors: Christian Jarisch, Paudex (CH); Alfred Yoakim, St.-Legier-la-Chiesaz (CH)

(73) Assignee: Nestec S.A., Vevey (CH)

( * ) Notice: Subject to any disclaimer, the term of this patent is extended or adjusted under 35 U.S.C. 154(b) by 770 days.

(21) Appl. No.: 11/568,622

(22) PCT Filed: Apr. 22, 2005

(86) PCT No.: PCT/EP2005/004370

§ 371 (c)(1),
(2), (4) Date: Nov. 13, 2006

(87) PCT Pub. No.: WO2005/104911

PCT Pub. Date: Nov. 10, 2005

(65) Prior Publication Data

US 2007/0246478 A1  Oct. 25, 2007

(30) Foreign Application Priority Data

May 5, 2004  (EP)  ................................. 04010646

(51) Int. Cl.
G07F 11/46  (2006.01)
(52) U.S. Cl. ........................ 221/188; 221/133; 221/131; 221/121; 221/104; 221/105
(58) Field of Classification Search .................. 221/133
See application file for complete search history.

(56) References Cited

U.S. PATENT DOCUMENTS

| 1,633,588 | A |   | 6/1927  | Klinenberg |   |
|---|---|---|---|---|---|
| 2,141,684 | A |   | 12/1938 | Diemer |   |
| 2,206,838 | A |   | 7/1940  | Emerson |   |
| 2,268,688 | A |   | 1/1942  | Andrews |   |
| 3,295,998 | A | * | 1/1967  | Goros | ........................ 221/193 |
| 4,829,889 | A | * | 5/1989  | Takeuchi et al. | ........... 99/289 P |
| 6,240,832 | B1 | * | 6/2001 | Schmed et al. | .............. 221/121 |
| 6,971,546 | B2 | * | 12/2005 | Costa | ........................ 221/298 |
| 7,231,279 | B2 | * | 6/2007 | Ghidotti | ..................... 700/239 |
| 2004/0129145 | A1 |  | 7/2004 | Denisart et al. |   |

FOREIGN PATENT DOCUMENTS

| FR | 715959 | 12/1931 |
| GB | 22473 | 9/1913 |
| GB | 290103 | 5/1928 |
| GB | 844600 | 8/1960 |
| WO | WO9605578 A1 | 2/1996 |
| WO | WO02096253 | 12/2002 |

* cited by examiner

Primary Examiner—Gene Crawford
Assistant Examiner—Timothy R Waggoner
(74) Attorney, Agent, or Firm—K&L Gates LLP

(57) ABSTRACT

Capsule-dispensing cabinet intended for supplying machines with the aim of preparing drinks or other food preparations, comprising: a body, a plurality of buffer storage housings (3, 30, 31, 32, 33, 34, 35) forming a capsule buffer store, intended to be supplied by a plurality of removable tubes (2) containing stacked capsules, each tube and buffer storage housing (3) being arranged relative to one another so as to form an aligned stack of capsules. Each buffer storage housing (3, 30, 31, 32, 33, 34, 35) comprises individual selection means (5) enabling a capsule contained in the stack to be released and collection means (6, 60, 61, 62, 63, 64, 65) enabling the capsule thus released to be collected.

15 Claims, 9 Drawing Sheets

CAPSULE-DISPENSING CABINET FOR SUPPLYING MACHINES FOR THE PREPARATION OF DRINKS OR OTHER FOOD PREPARATIONS

The present invention relates to a capsule-dispensing cabinet containing a food product for supplying machines with the aim of preparing drinks or other food preparations.

Within the food sector, the use of systems for preparing food products from capsules, such as drink-dispensing machines, is undergoing widespread expansion owing to the numerous advantages generally provided by these systems. These systems may be drink-dispensing machines, for example, which operate using capsules containing a drink base. Using these capsules, the consumer may prepare a drink simply, rapidly and mostly with minimum intervention in terms of preparation and/or cleaning.

These capsules may be, for example, portion packs whose configuration, size and/or nature vary considerably. These capsules may be made of plastic film, filter paper, aluminium or composite laminates and may be in the form of lenses or take other forms.

When these machines are used intensively, there is a need to have sufficient capsule reserves available to prevent the stock from running out and/or to offer a wider choice of capsules containing different food substances for the preparation of different specialities. To this end, a reserve of capsules may take the form of a stack in a reserved space and serve to supply capsules as required.

In particular, there is a need to dispense these capsules at workplaces where demand is generally high during a short period of the day, for example during the coffee break. There is therefore a need to dispense capsules in a practical manner, rapidly and, if appropriate, using a suitable method of payment.

For example, U.S. Pat. No. 6,595,106 relates to a magazine for capsules making it possible to store a plurality of capsules stacked one above the other. The capsules may thus be removed from the magazine on demand via an opening made at the base of the magazine. One disadvantage arises from the fact that the capsules have to be removed manually. Another disadvantage lies in the fact that this system cannot be associated with a payment means.

Patent application EP 1 247 481 A1 illustrates a drink-extraction device comprising an integrated capsule-loading system. Such a system is practical since it enables a capsule-extraction system to be supplied automatically by means of a carousel positioned in direct relation to the extraction system. Such a device comprises packs in the form of removable tubes for storing capsules, these packs being adapted in relation to tubular supports mounted on a rotating base. Such a system is practical although its capacity to prepare drinks is not at the level of its storage capacity. Thus, it is necessary to await the complete end of the extraction and removal of the spent capsule in order to be able to select and extract a new capsule. Neither does such a device make it possible to retain the capsule for a subsequent extraction of the capsule in the preparation machine if the user wishes to do so. Moreover, the extraction system can only be used with capsules contained in the dispenser, which may cause problems particularly if it is short of capsules of a desired type, or else if the dispenser breaks down. Moreover, the device does not make it possible to dispense a number of capsules from different stacks simultaneously or else to prepare a number of drinks at the same time.

U.S. Pat. No. 2,141,684 concerns the dispensing of elongate elements such as kitchen utensils. Supply takes place manually in a series of loaders forming part of the device and release takes place using independent push-button mechanisms.

U.S. Pat. No. 2,268,688 is a rotating sugar cube dispenser in which the cubes are dispensed from stacks held in a series of housings distributed over the circular periphery of the dispenser. The dispenser is supplied manually. Push-type mechanisms are provided to allow the sugar cube to drop into a central passage.

U.S. Pat. No. 2,206,838 is a dispenser of a stack of paper cups.

Patent GB 844,600 is a tetrahedral-pack dispenser, dispensing them from a single column using a tilting mechanism, permitting optimum stowing of the packs.

There is a need to make available a capsule-dispensing device which:
  is easy and practical to resupply by an operator or a user,
  satisfies capsule-dispensing requirements, without a waiting time, so that a high demand can be met,
  is easy to use and may be readily associated or combined with drink-preparation machines in a more flexible manner while complying with user expectations in terms of choice, quantity and practical nature, and
  which is closed, safeguarded and may be associated with a method of payment.

In order to achieve these aims and others besides, the invention relates to a capsule-dispensing cabinet intended for supplying machines with the aim of preparing drinks or other food preparations, comprising:
  a plurality of housings for the buffer storage of capsules, intended to be supplied by a plurality of removable tubes containing stacked capsules, each tube and buffer storage housing being arranged relative to one another so as to form a capsule reserve stack, characterized in that all the stacks thus formed are protected by a common enclosure which is configured to be open during the supplying of tubes and to be closed during the dispensing of capsules, and in that each buffer storage housing is associated with individual selection means enabling a capsule contained in the stack to be released, collection means enabling the capsule thus released to be collected and control means which are configured to control each selection means independently to release each capsule individually from a buffer storage housing and independently of the other buffer storage housings.

Such a device thus makes it possible to offer a wide choice of capsules from tube and buffer storage housing arrangements thus defined and comprises means which are safeguarded and designed to make available a capsule of one's choice without the disadvantages of the prior art systems. In particular, a capsule can be released and dispensed to the user from any stack of capsules contained in the cabinet without waiting for the end of the preparation of a drink. Such a device is therefore more flexible and more rapid to use. Such a system also offers easier loading of the capsules into the device. It allows a saving in time when restocking the capsules and does not require special skills to perform such a restocking operation.

Preferably, each buffer storage housing is mounted on a fixed base portion in the cabinet. Thus, since each arrangement for a series of capsules has its own selection and collection means, the complications connected with a moving base of the rotating type are avoided. The device is therefore simplified and the capsule can be served more rapidly.

Preferably, the selection means for each arrangement are mounted on the said fixed base portion. Likewise, such a construction makes it possible to design cabinets of different sizes in modular form, for example. Each module may thus comprise its own arrangement of tube, buffer storage housing, selection means and base portion, thus conferring a high degree of flexibility in the design. The collection means for each module may also be attached to the same base portion. The modules may thus comprise connection means enabling them to be assembled easily together depending on the capsule storage requirements. In another possible mode, these modules are formed from the same base made up of a single piece on which are assembled the buffer storage housings, the selection means and, if appropriate, the collection means.

Preferably, the selection means are of the solenoid type and are configured to be controlled electrically by the control means.

The selection means comprise stop means for selectively retaining and releasing the capsules from their respective stack, and actuating means for activating the said stop means in the stop or release position. Thus, the selection means are activated from actuating means comprising:

payment means;

control means whose number corresponds to the number of tube and buffer storage housing arrangements so as to allow a capsule to be selected from any arrangement.

In an advantageous aspect, the control means can be activated simultaneously or successively after payment so as to allow more than one capsule to be dispensed from different tube and housing arrangements.

In addition, the cabinet according to the invention may be configured to allow the selection and then the dispensing of capsules only after payment. Such a cabinet may be installed in private places such as offices, restaurants, rooms or halls or else in public places.

In order to provide rapid and practical dispensing, the collection means comprise an arrangement of ramps configured beneath selection means so as to recover the capsule in a collection zone. The capsules released by the selection means are thus immediately available and may thus be used in a drink-preparation machine designed to receive such a capsule at the same place where the cabinet is arranged or in a different place. The cabinet thus provides greater flexibility and freedom in the use of the capsules.

In a preferred embodiment, the capsule collection means comprise at least two ramps with opposed edges and a stop ledge for the capsule. Such a system constitutes a security measure against attacks against the device. It thus guarantees better tamper resistance.

In their preferred configuration, the collection means are aligned in the same horizontal plane forming a continuous collection zone which is open to the front of the cabinet. One advantage is to facilitate recovery of the capsules once they are in the collection zone, for example, thus making it possible for a number of capsules coming from different capsule reserve arrangements to be collected and recovered more easily at the same time.

The cabinet according to the invention also comprises, advantageously, a closed assembly comprising a case and at least one windowed door which can be locked against the case, the said assembly containing the pluralities of tubes and buffer zones forming the series of capsule stacks. Thus, the cabinet of the invention forms a display cabinet making it possible both for the capsules to be easily selected by the user, for example using simple colour codes allowing recognition of the capsules, and to have a device for monitoring the supply of the capsules.

According to a preferred embodiment, each tube is arranged with its buffer storage housing by alignment means comprising means for retaining the capsules in their stack when the tube is moved with its opening directed downwards, in the direction of the position in which the tube is aligned with the buffer storage housing. In addition, the alignment means comprise tilt guidance means for the tube which are configured in association with the retaining means to maintain the stack of capsules in constant bearing contact against the retaining means. Such a configuration makes it possible to supply the cabinet with capsules from an open tube without the risk of dispersing the capsules or disordering them in the stack. Loading is thus simplified and quicker as a result.

The dispensing device of the invention may advantageously be combined with a drink-dispensing device, the latter comprising at least two separate extraction or infusion heads. The extraction or infusion heads are designed to receive the capsules manually and to be able to prepare a drink from these capsules after collection of these by the user and insertion by the user of one of these capsules into each housing of each head. Such a configuration offers greater flexibility and speed in the preparation of a number of drinks at the same time. Thus, the functions of dispensing and of extraction of the capsules are separated such that the extraction capability can be better adapted to a sudden high demand without the dispensing operation slowing down this drink-extraction capability.

These characteristics and their advantages together with others which are possible may be better understood in the light of the description below and of the drawings which follow.

The term "capsule" signifies any type of portioned and packed food products. These may be portions of coffee, tea, powdered chocolate, plant extracts, milk, cream or a substitute, soups, culinary products or combinations thereof. The pack may employ materials of different kinds, such as plastics, metals, paper or cardboard, and composites of these materials. The shape of the capsules may be variable. They may have lenticular, parallelepipedal, oblong, pot-like or other shapes.

Figure 1:
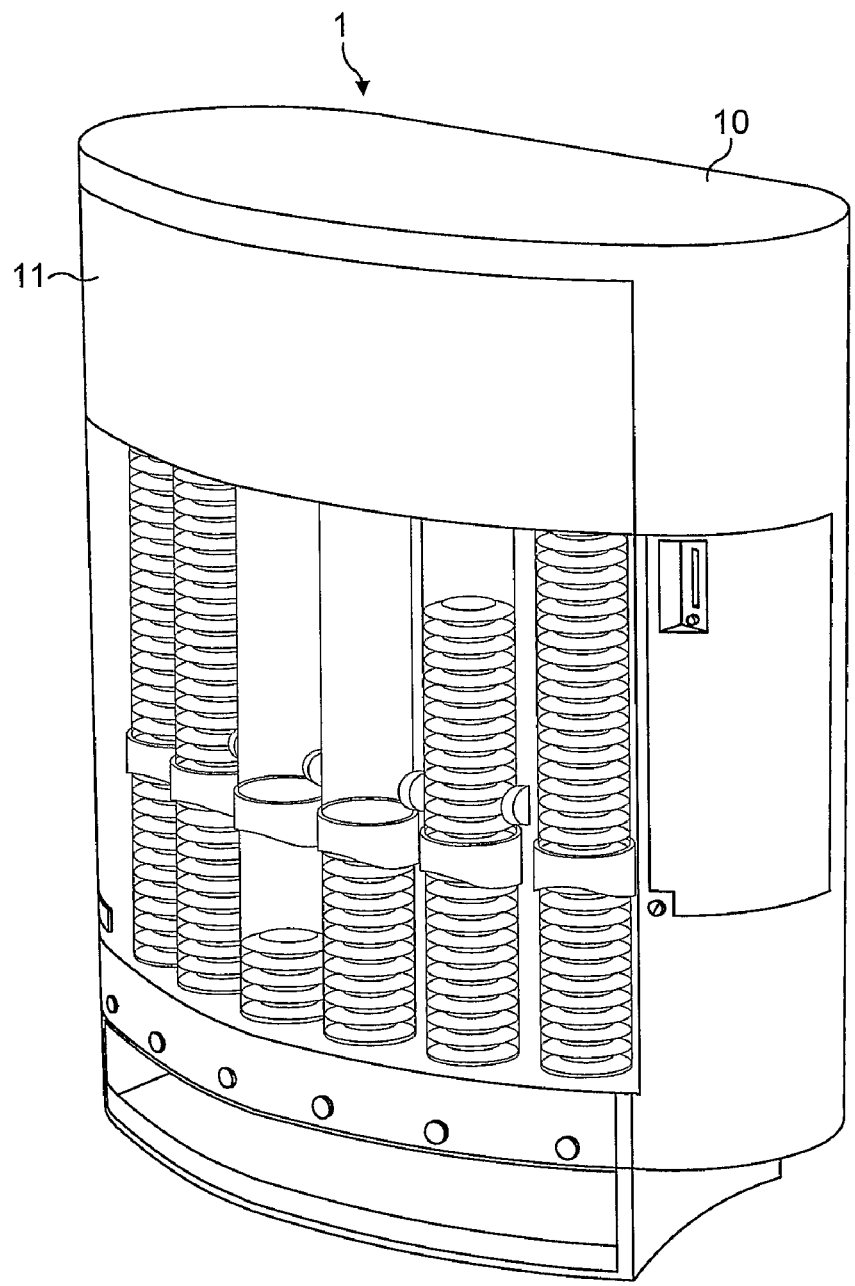
FIG. 1 is a general perspective view of the cabinet according to the invention.
Figure 2:
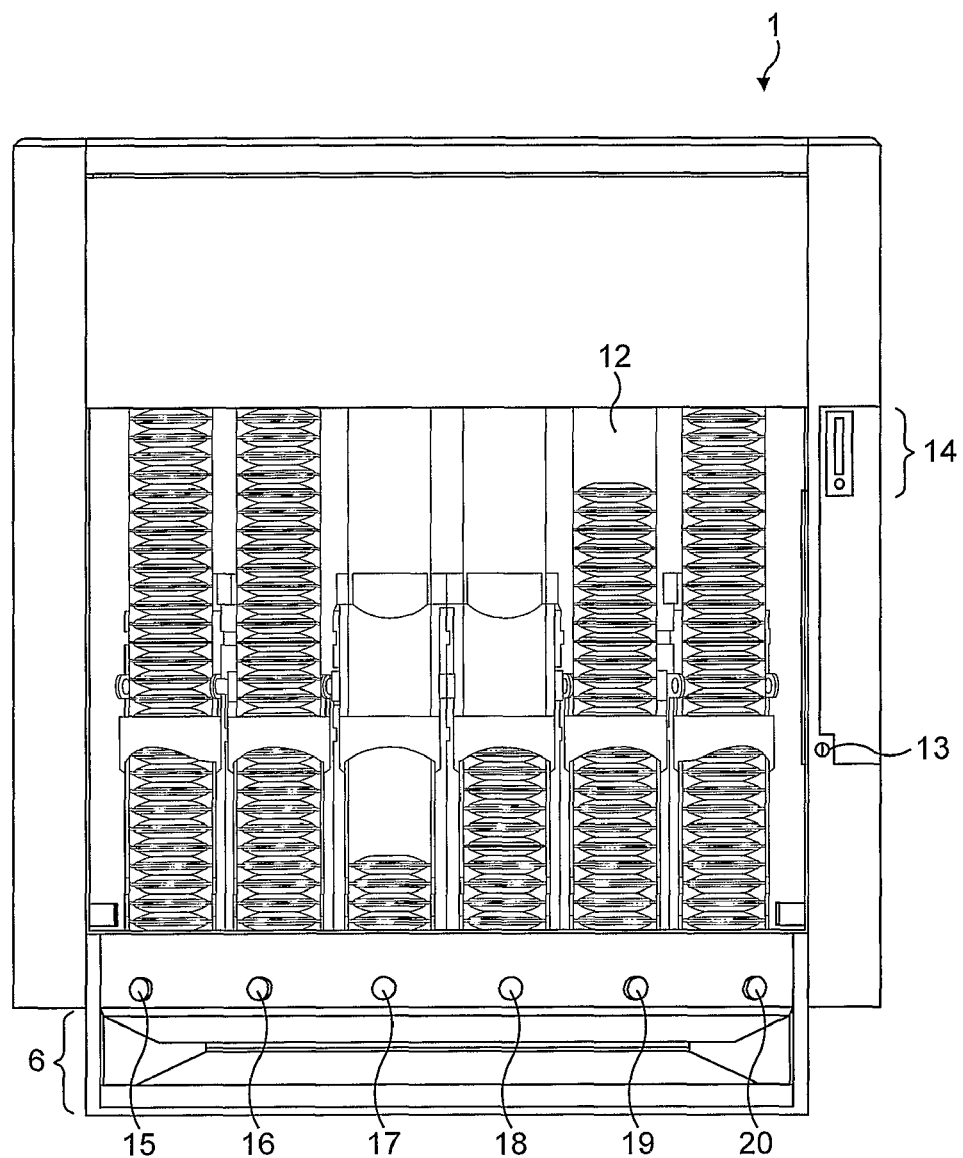
FIG. 2 is a front elevation of the cabinet according to the invention.

With reference to FIGS. 1 and 2, the cabinet of the invention has the reference 1. It comprises a body delimiting a closed enclosure intended to receive a number of stacks of vertically ordered capsules in arrangements formed by tubes and by housings for the buffer storage of capsules, as will be described later on. The body of the cabinet is advantageously formed by a case 10 and by at least one windowed door 11, which come together on closure to constitute the said closed enclosure. The windowed door 11 is provided with at least one transparent part 12, made of clear plastic for instance, to make it possible to offer a direct view of the capsule reserves from outside and also to facilitate the choice of the type of capsules selected. The windowed door 11 can be mounted on one of the sides of the case by hinge means (not shown) and on the other by at least one locking system 13 having key-type or card-type opening, or other systems. The case and the frame of the windowed door may be manufactured by injection moulding of hard plastics, for example. Situated in the bottom part of the body of the cabinet are the capsule collection means 6, from which the selected and released capsules can be recovered.

The capsules are selected by the user after he has activated activation means comprising payment means 14 and then control means 15, 16, 17, 18, 19, 20. The control means may take the form of control keys, for example, positioned under each capsule reserve arrangement, as represented, or else the form of a control panel in which the control keys are grouped together, the control panel being positioned at a point on the body, either, for example, on the case or on another part of the body. The payment means may be of any type such as a coin mechanism or a coin-free electronic payment system, such as a magnetic or chip card reader, or else a remote electronic payment system.

Figure 3:
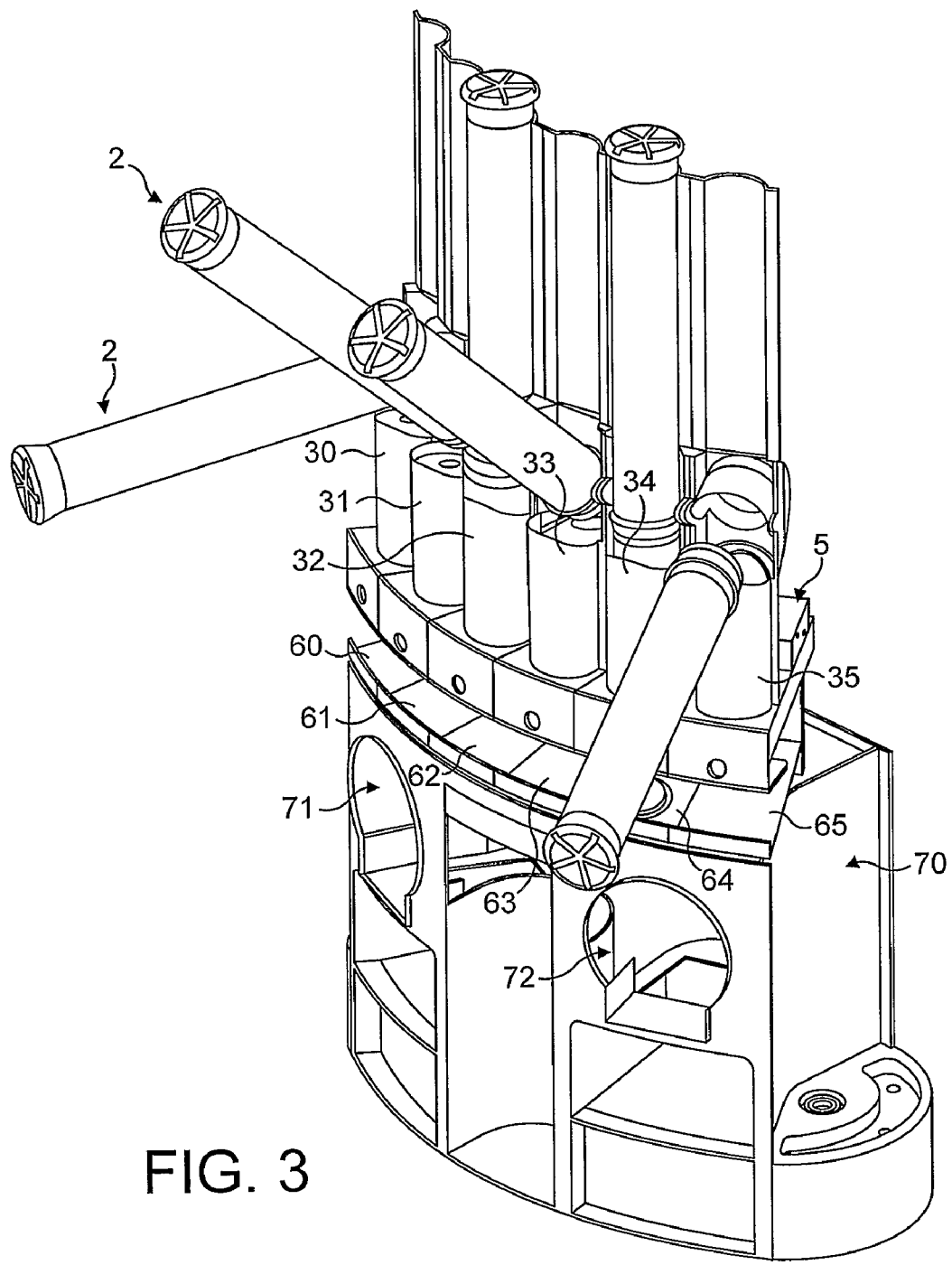
FIG. 3 is a front perspective view of a variant of the cabinet, the body of the cabinet having been removed.
Figure 4:
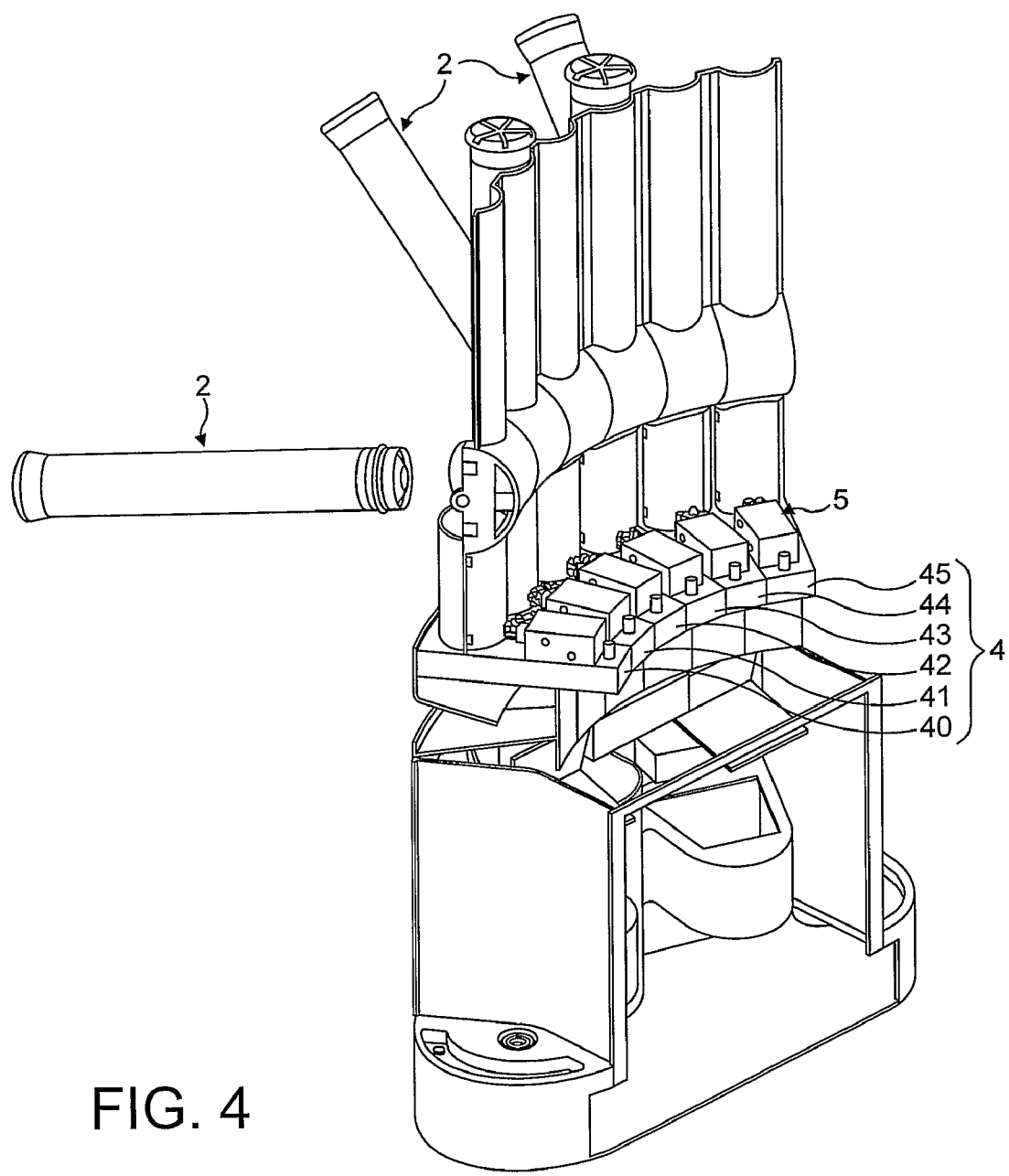
FIG. 4 is a rear perspective view of the variant of FIG. 3.
Figure 5:
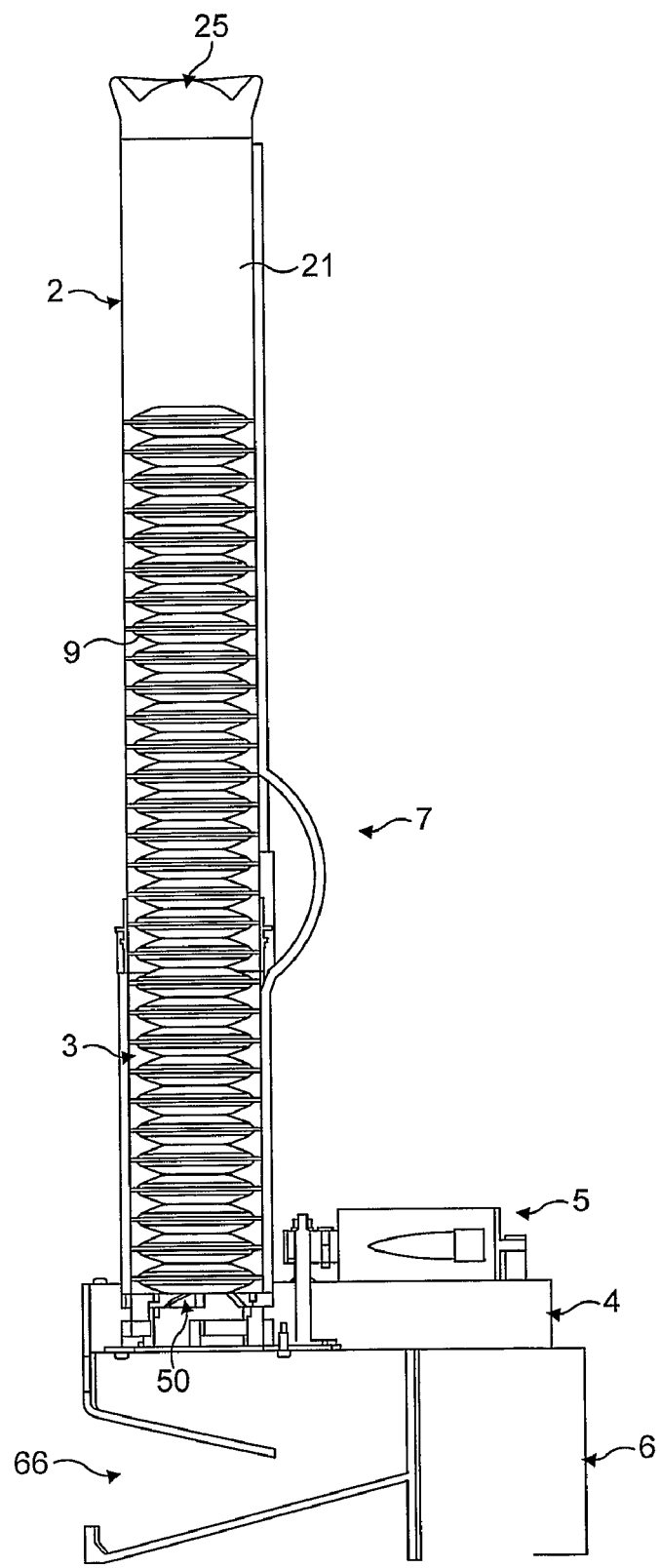
FIG. 5 is a sectional view of a module of the cabinet.

FIGS. 3 to 5 show a capsule-dispensing cabinet without the protection of the surrounding body. The cabinet comprises a plurality of buffer storage housings 30, 31, 32, 33, 34, 35 which are able to receive a certain number of capsules stacked to form a buffer store. These housings may each have the form of a tube portion mounted fixedly on a base portion 40, 41, 42, 43, 44, 45. As shown in FIG. 5, each tube portion has a lower passage 50 through which the capsules are selectively released by selection means 5. The selection means are also individual for each passage of each buffer storage housing.

The base portions 40-45 are continued downwards by the collection means, themselves in the form of collection portions 60, 61, 62, 63, 64, 65. The collection portions preferably extend in a substantially horizontal plane so as to form a continuous collection zone 66 which is open to the front. Such a zone makes it possible to easily recover the capsules, once they are released, from any tube/housing arrangement.

The buffer storage housings are continued upwards by alignment means 7 which make it possible for each buffer housing to have coupled to it a removable tube 2 comprising a capsule refill.

It will be understood that the alignment means 7, the buffer storage housings 3, the base portions 6, the selection means 5, the collection portions 6, and also each tube 2, thus form an assembly of individual modules designed to store, select, release and recover the capsules from their respective stack. An example of a module is illustrated in section in FIG. 5.

The cabinet of the invention is a modular system in the sense that the modules thus defined can be assembled together as many times as necessary depending on the choice and/or storage of desired capsules. It is understood that the modules may be portions which may be designed to be assembled mechanically using specific connection means which are complementary with one another or else, otherwise, may be modules connected by common platforms. For example, common platforms may be the base portions 40-45 which may form one and the same base 4 made of a single moulded plastic component or of a number of components integrally combining a number of portions. Likewise, the collection portions 60-65 may also be designed as common component or components. The modules can be assembled to form a linear, arcuate or circular arrangement of several modules.

Figure 6:
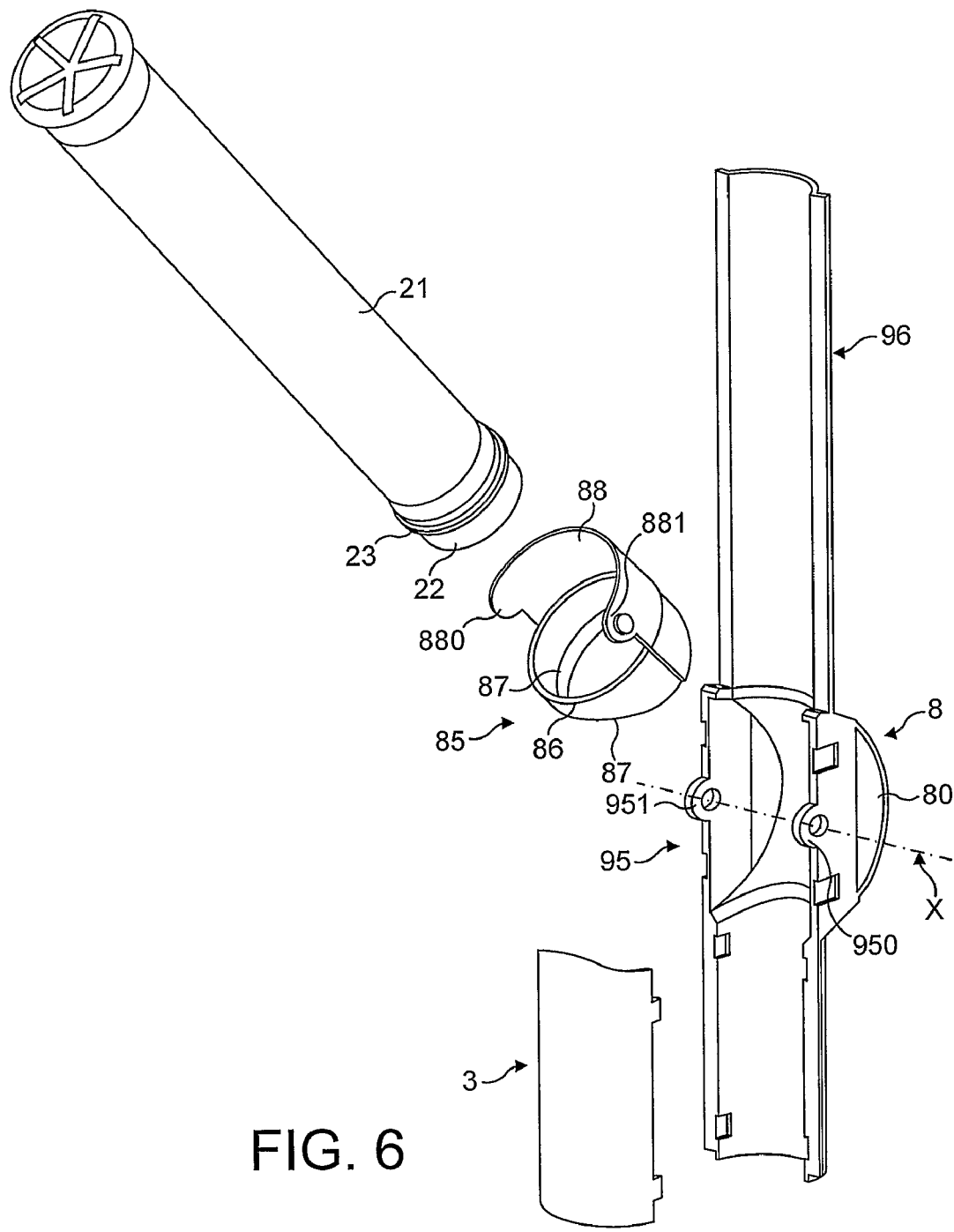
FIG. 6 is an exploded view of a tube and buffer tube arrangement, showing the loading device.

The device for aligning the capsule reserve tubes is represented in FIGS. 5 and 6. The device is composed of a removable tube 2 acting as a reserve for a series of capsules 9 and of means 7 of alignment with respect to a buffer zone 3. Capsules 9 are therefore stored in a stack in the tube and others in the buffer storage housing, the whole in the form of an aligned stack of capsules.

The term "tube" is to be interpreted in the broad sense and includes any type of container of varied form. However, it is preferable to provide a tube which comprises an end-piece 25, a body 21 of sufficient length to enable a sufficient number of capsules to be stored, a plug 22 (removed before loading) closing an opening opposite the end-piece for transportation, and connection means 23 enabling the tube to be connected relative to the alignment means, as will be described in detail later on. The tube has a form which is adapted to the cross section of the capsules. Thus, when the capsules have a circular shape, as is shown, the tube itself has a circular cross section. However, many other forms of capsules and/or tubes may be envisaged without departing from the scope of the invention.

The tube may be a disposable or recyclable pack formed from a plastic, cellulosic or composite material. The tube may be manufactured by any suitable technique such as by moulding, or by cutting, folding, bonding or sealing or other equivalent techniques. Preferably, the main part of the tube, apart from the plug, consists of a plastic which can be blow-moulded. For this purpose, the tube is manufactured by producing a plastic preform by extrusion and moulding in a mould conferring the size and the shape of the preform. Then, the preform is stretched and blow-moulded in a second mould having a size and form corresponding to the final form of the tube. The preform may be stretched by mechanical elongation using a stretching rod and then by blow-moulding using a pressurized gas, or else by blow-moulding alone. The advantage of such a technique resides in the possibility of making a slender, transparent or translucent refill tube having the precise dimensions enabling it to be correctly fitted into the alignment means. Finally, such a technique is also economical when applied to large manufacturing runs.

According to the invention, the alignment means 7 comprise capsule-retaining means 8 in the form of a retaining surface 80 arranged in such a way as to retain the capsules when the tube is tilted from a position in which the opening of the tube is substantially horizontal or directed upwards toward a position in which the opening is then directed downwards in a position of alignment, then allowing the said capsules to pass through the buffer storage housing.

The alignment means 7 preferably also comprise tilt guidance means 85 serving to guide the tube during the tilting thereof into an alignment position. These means are arranged in association with the retaining means 8 so that the stack of capsules can bear against the retaining surface 80 at the moment when the tube is being tilted.

The tilt guidance means 85 comprise a tube support 86 comprising connection means 87 which are complementary with the connection means 23 of the tube. The connection means 23, 87 may be of any possible type such as to form a screw-in arrangement or a mechanical interlocking of the bayonet type, or any equivalent means. The tube support preferably has a shape into which the tube can be inserted or fitted so as to achieve rigid interlocking. It comprises edges delimiting an opening with a cross section enabling the capsules to pass through. The support is rotatably mounted about an axis of rotation X on a base 95 of the retaining means, comprising two opposed lateral wings 950, 951. The lateral wings extend on either side of the retaining surface 80 and comprise apertures enabling the tube support 86 to be connected along the axis X. The tube support may be permanently mounted on the base or be mounted removably. In the latter case, the tube support 86 may be mounted either removably or permanently on the tube 2.

The retaining surface 80 and the tube support 86 have particular shapes enabling the tube and the support to be rotated along the said retaining surface through a sufficient angle until reaching the alignment position. Thus, the retaining surface is preferably an arcuate surface, the axis of whose centre is the axis X. The tube support has an edge 87, directed towards the retaining surface, which, when generated through one revolution, has a sinusoidal shape. Such a shape ensures that the edge of the tube support comes optimally close along the retaining surface 80 during the rotational tilting of the tube, which permanently closes the tube support and prevents any possibility of the capsules sliding on the sides. The fact is that the capsule stack has a ready tendency to tilt on one side or on the other and any opening could create a passage under the capsules and lead some of them to block the system.

The tube support also has a collar 88 directed towards the retaining means 8, the function of which is to act as stop means when the tube and its support come into a position of alignment with respect to the collection zone. The collar is continued laterally by lateral tabs 880, 881 which support the pivot-fastening means, the function of which is to be connected to the lateral wings 950, 951 of the retaining means. Of course, the stop means and also the surfaces to which the fastening means are attached may take other shapes while providing the same function, without thereby departing from the scope of the invention.

It should be pointed out that the tilt guidance means 85 are optional although very useful for providing problem-free rapid loading. In fact, it will be possible to dispense with these means and provide for the tilting to be carried out manually by simply applying the tube against the retaining surface 80. In that case, provision would need to be made for the tube to have an opening whose edges are also of sinusoidal shape, or else the tube support would have to be adapted so that its edges have this same shape. In the latter case, the tube support does not require rotation means which are attached to the retaining means 8, since the tilting movement is performed by manual guidance while maintaining the opening along the retaining surface 80. It should also be noted that the buffer storage housings could be arranged in a tilting manner with respect to the base portion so as to facilitate loading.

The retaining means are continued upwards by bearing means 96 against which the tube can bear in the alignment position. Such means may be, for example, a tube half-portion of complementary shape with the external half-surface of the tube. Bearing means of different configuration may be envisaged, such as rods, plates, grids or the like.

Figure 7:
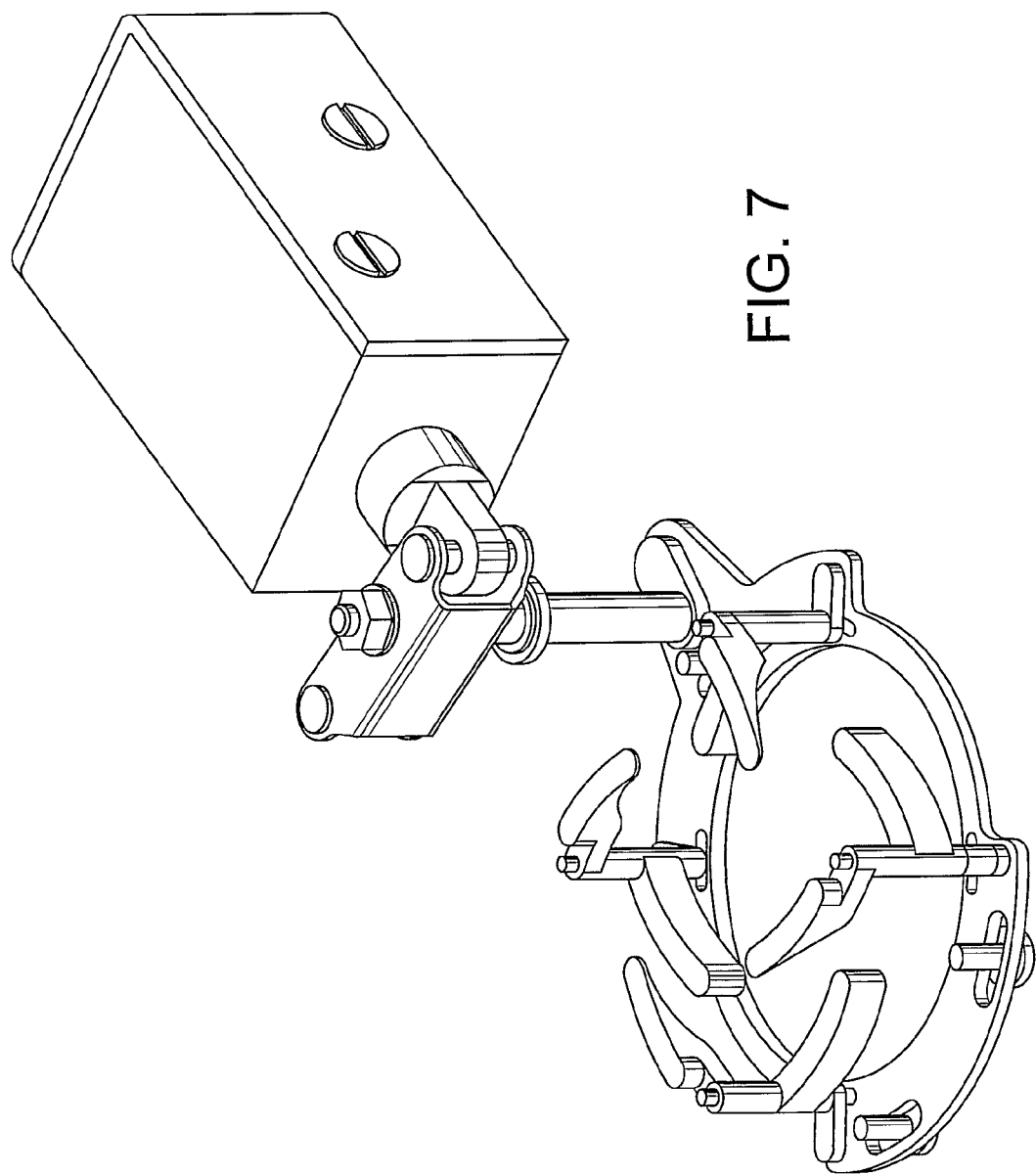
FIG. 7 is a perspective view of the selection means according to a preferred embodiment.

The housing 3 for the buffer storage of the capsules is situated underneath the retaining means, in the continuation of the retaining surface 80. The buffer storage housing has the function of acting as a storage zone for a certain number of capsules. Consequently, when a tube 2 is removed, the device can contain capsules which are able to be dispensed or transferred. The upper edges of the buffer zone 3 are cut so that they can be adapted to the shape of the edges of the tube support 85 to allow a clean junction between the surfaces, particularly between the internal surfaces, and thus prevent any catching of the capsules during their unloading into the buffer zone. Housed below the tube portion is a capsule selection device having the function of releasing the capsules individually. A preferred embodiment of the selection device is illustrated in FIG. 7, which is also described in the co-pending application filed on the same day and entitled: "Device for the selection of capsules contained in a stack", and the entire content of which is incorporated by reference herein.

According to another advantageous aspect of the invention, the control means may be activated simultaneously or successively in order to allow more than one capsule to be dispensed from different tube and housing arrangements. The simultaneous or successive activation of the control means may be performed, by a monitoring means, following payment corresponding to the number of capsules desired via payment means 14. Depending on the amount paid, a whole number of pulses is recorded by an electronic counter which keeps the control means activated until this whole number has been reached. It is thus possible to dispense a number of capsules from different tubes/housings simultaneously; this makes the device more user-friendly, more practical and more rapid.

Figure 8:
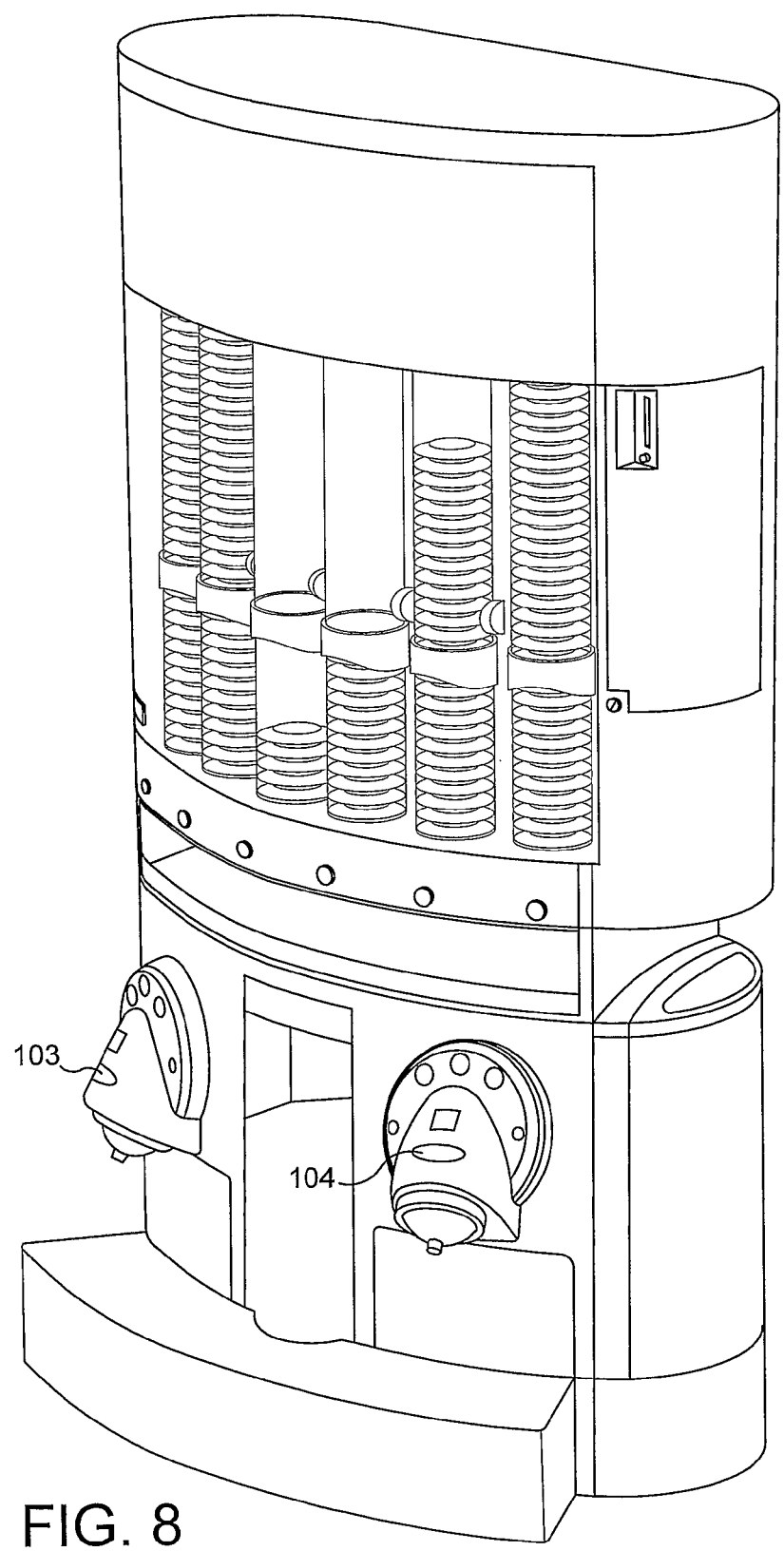
FIG. 8 shows a perspective view of a capsule-dispensing device according to the invention combined with a device for dispensing drinks from these capsules, this drink-dispensing device comprising two separate extraction heads.
Figure 9:
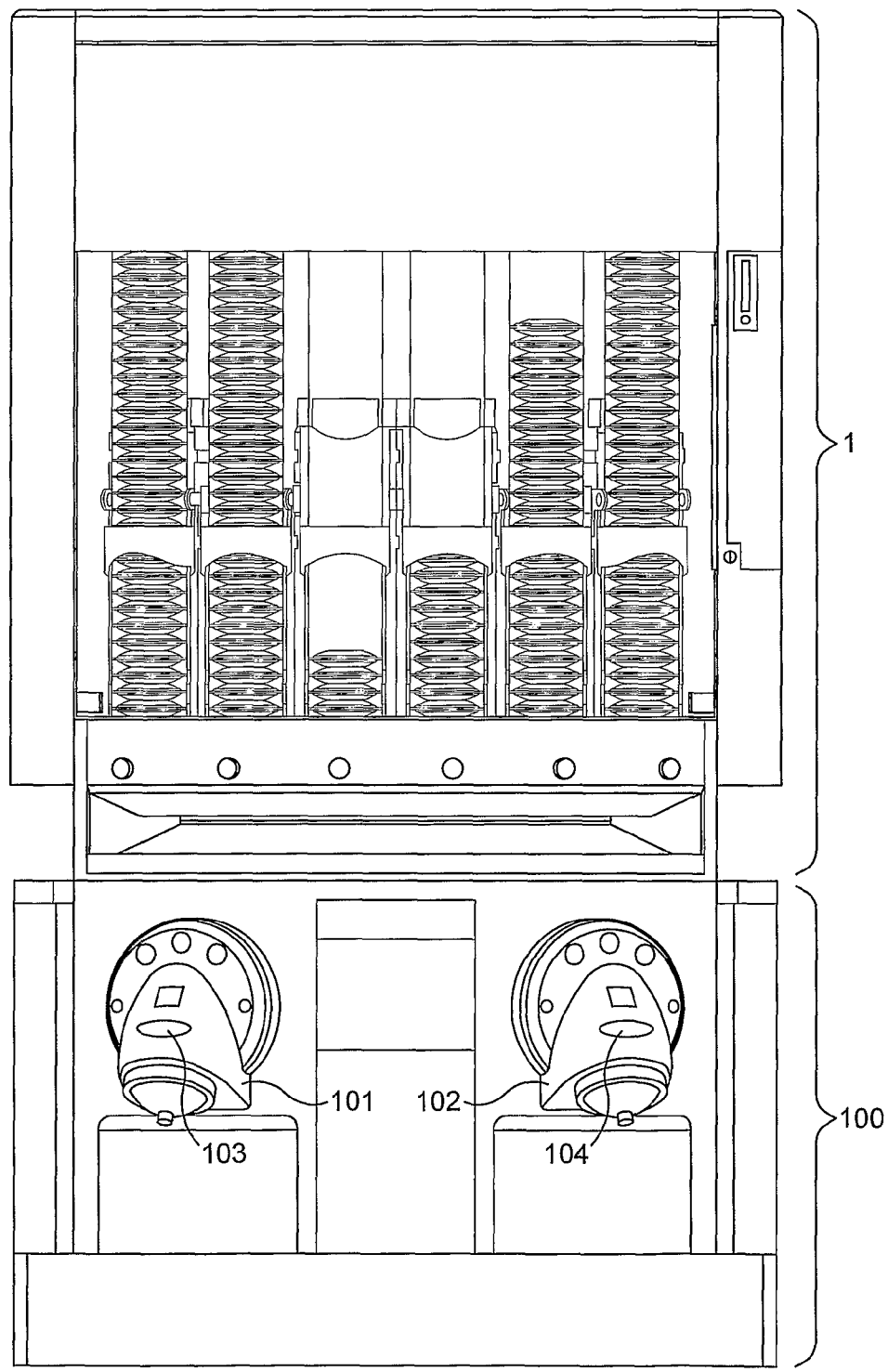
FIG. 9 shows a front elevation of the device of FIG. 8.

A cabinet according to the invention may be associated directly or indirectly with drink-preparation means designed to take charge of the capsules contained in the cabinet. As shown in FIG. 3, the cabinet may be placed on or be physically connected to a supporting structure 70 comprising housings which can accommodate components necessary for the preparation of pressurized drinks. For example, the structure 70 comprises two housings 71, 72 designed to receive two separate extraction or filtration heads. FIGS. 8 and 9 show a cabinet combined with a drink-dispensing device 100 comprising two extraction heads 101, 102. Each extraction head comprises a housing 103, 104 into which the capsule is inserted. The capsule is inserted manually by the user after being collected from the capsule dispenser 1. Each extraction head operates, for example, according to the principle described in patent application WO 2004/071259, the content of which is incorporated by reference herein, or any other similar or approximate principle.

The advantage of the design of the cabinet according to the invention is therefore also to increase the service capacity by rapidly making available capsules which can then be extracted or filtered in drink-extraction or -filtration devices designed to receive and process these capsules.

The invention has been described by way of preferred examples. However, it will be understood that the invention may comprise variants or equivalents within the scope of a person skilled in the art which are covered by the claims which follow.

The invention claimed is:

1. Capsule-dispensing cabinet comprising:
   a plurality of housings for storage of capsules, intended to be supplied by a plurality of tubes containing stacked capsules, each tube and storage housing being coupled to one another by alignment means so as to form an aligned stack of capsules, the alignment means configured to allow the tube to pivot with respect to the housing, wherein
   stacks thus formed are protected by an enclosure which is configured to be open during a tube loading and to be closed for dispensing capsules, and
   each storage housing is associated with individual selection means enabling a capsule contained in the stack to be released, collection means enabling the capsule thus released to be collected and control means which are configured to control each selection means independently to release each capsule individually from a storage housing and independently of the other storage housings.

2. Cabinet according to claim 1, wherein each storage housing is mounted on a fixed base portion in the cabinet.

3. Cabinet according to claim 2, wherein the selection means are mounted on the fixed base portion.

4. Cabinet according to claim 1, wherein the selection means comprise stop means for selectively retaining and releasing the capsules from their stack, and actuating means for activating the stop means into a stop or release position.

5. Cabinet according to claim 1, wherein the selection means are activated from actuating means comprising:

payment means; and control means having a number corresponding to a number of the tube and storage housing arrangements so as to allow a capsule to be selected from any arrangement.

6. Cabinet according to claim 5, wherein the control means can be activated simultaneously or successively after payment so as to allow more than one capsule to be dispensed from different tube and housing arrangements.

7. Cabinet according to claim 1, wherein the collection means comprise an arrangement of ramps configured under the selection means to recover the capsule in a collection zone.

8. Cabinet according to claim 7, wherein the capsule collection means comprise at least two ramps with opposed edges and a stop edge for the capsule.

9. Cabinet according to claim 7, wherein the collection means are aligned in a same horizontal plane forming a continuous collection zone which is open to a front of the cabinet.

10. Cabinet according to claim 7, comprising a closed assembly comprising a case and at least one windowed door which can be locked against the case, the assembly containing the tubes and storage housings forming the series of capsule stacks.

11. Cabinet according to claim 1, the alignment means comprising means for retaining the capsules in their stack when the tube is moved with its opening directed downwards, in a direction of a position in which the tube is aligned with the storage housing.

12. Cabinet according to claim 1 in combination with a drink-dispensing device.

13. Cabinet according to claim 1 in combination with a drink-dispensing device that comprises at least two separate extraction heads.

14. Capsule dispenser cabinet comprising:

a plurality of housings for the storage of capsules, a plurality of tubes containing stacked capsules, each tube and storage housing being coupled to one another by alignment means so as to form an aligned stack of capsules, the alignment means configured to allow the tube to pivot with respect to the housing, the stacks thus formed are covered by an enclosure which is open during tube loading and is closed for dispensing capsules, and each storage housing being associated with an individual selector so that a capsule contained in the stack can be released, a collector collecting the released capsule and a controller that controls each selector independently to release each capsule individually from a storage housing and independently of the other storage housings.

15. Capsule-dispensing cabinet comprising:

a plurality of housings for storage of capsules, intended to be supplied by a plurality of tubes containing stacked capsules, each tube and storage housing being arranged relative to one another so as to form an aligned stack of capsules, wherein stacks thus formed are protected by an enclosure which is configured to be open during a tube loading and to be closed for dispensing capsules, and each storage housing is associated with individual selection means enabling a capsule contained in the stack to be released, collection means enabling the capsule thus released to be collected and control means which are configured to control each selection means independently to release each capsule individually from a storage housing and independently of the other storage housings, wherein each tube is arranged with its storage housing by the alignment means comprising means for retaining the capsules in their stack when the tube is moved with its opening directed downwards, in a direction of a position in which the tube is aligned with the storage housing, and wherein the alignment means comprise tilt guidance means for the tube which are configured in association with the retaining means to maintain the stack of capsules in constant bearing contact against the retaining means.

* * * * *